United States Patent
Peterson et al.

(10) Patent No.: US 6,296,293 B1
(45) Date of Patent: Oct. 2, 2001

(54) SLIDABLE AUXILIARY SUN VISOR ASSEMBLY

(75) Inventors: Don M. Peterson, West Bloomfield; Douglas J. Wilson, Burtchville, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/561,234

(22) Filed: Apr. 28, 2000

(51) Int. Cl.$^7$ .................................................... B60J 3/00
(52) U.S. Cl. .................. 296/97.11; 296/97.9; 296/97.12; 296/97.1; 296/97.13
(58) Field of Search .................. 296/97.11, 97.9, 296/97.12, 97.1, 97.13

(56) References Cited

U.S. PATENT DOCUMENTS

| | | | | |
|---|---|---|---|---|
| 2,458,707 | * | 1/1949 | Jacobs ................................ | 296/97.11 |
| 2,521,949 | * | 10/1950 | Miller et al. ........................ | 296/97.12 |
| 2,628,861 | * | 2/1953 | Greig .................................. | 296/97.12 |
| 4,617,699 | * | 10/1986 | Nkamura ............................. | 296/97.1 |
| 4,902,063 | * | 2/1990 | Crink .................................. | 296/97.11 |
| 4,953,064 | * | 8/1990 | Viertel et al. ....................... | 296/97.9 |
| 5,054,839 | * | 10/1991 | White et al. ........................ | 296/97.1 |
| 5,139,303 | | 8/1992 | Miller . | |
| 5,556,155 | * | 9/1996 | Welter ................................ | 296/97.12 |
| 5,603,547 | * | 2/1997 | Finn et al. .......................... | 296/97.1 |
| 5,924,748 | * | 7/1999 | Zapinski ............................. | 296/97.1 |
| 5,934,734 | * | 8/1999 | Wilson ............................... | 296/97.11 |
| 5,967,587 | * | 10/1999 | Collet et al. ....................... | 296/97.11 |
| 5,967,588 | * | 10/1999 | Collet et al. ....................... | 296/97.11 |

FOREIGN PATENT DOCUMENTS

| | | | | |
|---|---|---|---|---|
| 3703509 | * | 9/1987 | (DE) ................................... | 296/97.9 |
| 3717094 | * | 12/1988 | (DE) ................................... | 296/97.13 |
| WO 93/25402 | * | 12/1993 | (ES) ................................... | 296/97.9 |
| 2697479 | * | 11/1992 | (FR) ................................... | 296/97.13 |
| 57-209422 | * | 12/1982 | (JP) ................................... | 296/97.9 |
| 5-286362 | * | 11/1993 | (JP) ................................... | 296/97.11 |
| 5-286363 | * | 11/1993 | (JP) ................................... | 296/97.11 |

* cited by examiner

*Primary Examiner*—Joseph D. Pape
*Assistant Examiner*—Kiran B. Patel
(74) *Attorney, Agent, or Firm*—Brooks & Kushman P.C.

(57) ABSTRACT

The present invention involves a auxiliary sun visor assembly for a vehicle which is laterally adjustable and sufficiently compact to fit between a headliner and a main visor of the vehicle. The assembly provides greater blockage than conventionally provided by a single sun visor. The assembly is sufficiently compact to fit between the headliner and the main visor without substantially biasing the main visor away from the headliner. The assembly includes a visor body, a support arm having first and second ends and a ridge extending longitudinally between the ends, a detent clip for supporting the visor body and movable pivotably and slidably longitudinally with respect to the support arm, and a u-shaped bushing having terminal portions wrapped around the support arm between the detent clip and the support arm wherein the terminal portions terminate substantially at opposite sides of the ridge preventing the bushing from pivotal movement about the support arm.

10 Claims, 3 Drawing Sheets

SLIDABLE AUXILIARY SUN VISOR ASSEMBLY

TECHNICAL FIELD

The present invention relates to a motor vehicle auxiliary sun visor which is laterally adjustable and is sufficiently compact to fit between a headliner and a main visor of the vehicle.

BACKGROUND ART

There is a need for an improved sun visor assembly having more simple components to lessen manufacturing costs. Many sun visor assemblies are sufficient, but may be simplified by using more simple components. For example, U.S. Pat. No. 5,934,734 provides a slidable sun visor assembly having an anti-backlash device. The assembly is laterally adjustable as desired by the passenger.

There is also a need for an improved sun visor assembly having components which are more compact than previous assemblies to improve the aesthetic look. Especially in situations where an auxiliary sun visor is implemented, the auxiliary sun visor assembly should be designed to fit in a headliner pocket between the headliner and a main sun visor of the vehicle. Otherwise, the main sun visor of the vehicle may be biased downwardly due to a relatively thick auxiliary sun visor assembly, resulting in an undesirable aesthetic look.

Thus, what is needed is an improved sun visor assembly for slidable lateral movement. What is also needed is an improved auxiliary sun visor assembly having simple components, resulting in lower manufacturing costs.

What is also needed is an improved auxiliary sun visor assembly having compact components adequate to allow the assembly to fit in a headliner pocket between the headliner and a main visor.

DISCLOSURE OF INVENTION

It is an object of the present invention to provide for an improved sun visor assembly for a vehicle. The sun visor assembly comprises a visor body, a support arm, a detent clip for supporting the visor body and movable pivotably and slidable longitudinally with respect to the support arm, and a unshaped bushing between the detent clip and the support arm. The support arm has first and second ends and a ridge which extends longitudinally between the ends. The first end is adapted to cooperate with the vehicle. The detent clip moves and slides between the first and second ends of the support arm. The unshaped bushing has terminal portions wrapped around the support arm and terminates substantially at opposite sides of the ridge, preventing the bushing from substantial pivotable movement with respect to the support arm. The detent clip has a visor support portion and a detent portion wherein the visor support portion substantially encircles the unshaped bushing and is pivotable with respect to the bushing. The detent portion is pivotably movable between a bridged position when it is pivoted to bridge the terminal portions of the bushing to store the visor body. The detent portion also has an unbridged position when it is pivoted away from the bridged position to maintain a sufficient frictional bias between the bushing and the detent portion in order to hold the visor body in a pivotal position with respect to the bushing.

In another embodiment, the assembly comprises a visor body, a support arm, a housing for supporting the visor body and attached about the support arm, and a detent control attaching to the support arm for pivotal movement thereabout and disposed in the housing. The support arm has first and second ends and a flat extending longitudinally and positioned between the ends wherein the first end is adapted to cooperate with the vehicle. The housing is attached about the support arm for slidable movement across and pivotal movement about the support arm. The detent control has upper and lower regions wherein the upper region attaches to the support arm for pivotal movement thereabout. The upper region is movable to a bridged position when pivoted to engage the flat of the support arm in order to store the visor body and an unbridged position when pivoted away from the bridged position wherein it is configured to maintain a sufficient frictional bias between the support arm and the detent control, holding the detent control longitudinally stationary therealong and allowing the detent control to pivot about the support arm. The lower region is disposed in the housing to store the lower region of the detent in the housing and allow slidable movement of the housing with respect to the detent control.

In a further embodiment, the assembly includes a visor body, a support arm, a detent clip for supporting the visor body and moveable pivotably and slidable longitudinally with respect to the support arm, and a u-shaped bushing between the detent clip and the support arm. The support arm has first and second ends and a ridge which extends longitudinally between the ends. The first end is adapted to cooperate with the vehicle. The detent clip moves and slides between the first and second ends of the support arm. The u-shaped bushing has terminal portions wrapped around the support arm and terminates substantially at opposite ends of the ridge, thereby preventing the bushing from substantial pivotal movement with respect to the support arm. The detent clip has a visor support portion and a detent portion wherein the visor support portion substantially encircles the u-shaped bushing and is pivotable with respect to the bushing. The detent portion is pivotable with the visor support portion and has a bridged position when it is pivoted to bridge the terminal portions of the bushing to store the visor body. The detent portion also has an unbridged position when it is pivoted away from the bridged position and configured to maintain a sufficient frictional bias between the bushing and the detent portion in order to hold the visor body in any pivotal position with respect to the bushing. The u-shaped bushing has a groove formed on an outer surface of the bushing to receive the visor support portion pivotably attached thereabout. The groove defines a pair of opposed end walls which flank the visor support portion in order to hold the visor support portion in slidable longitudinal position with the bushing.

Other objects, features, and advantages of the present invention will be apparent from the ensuing description in conjunction with the accompanying drawings.

BEST MODE FOR CARRYING OUT THE INVENTION

Figure 1:
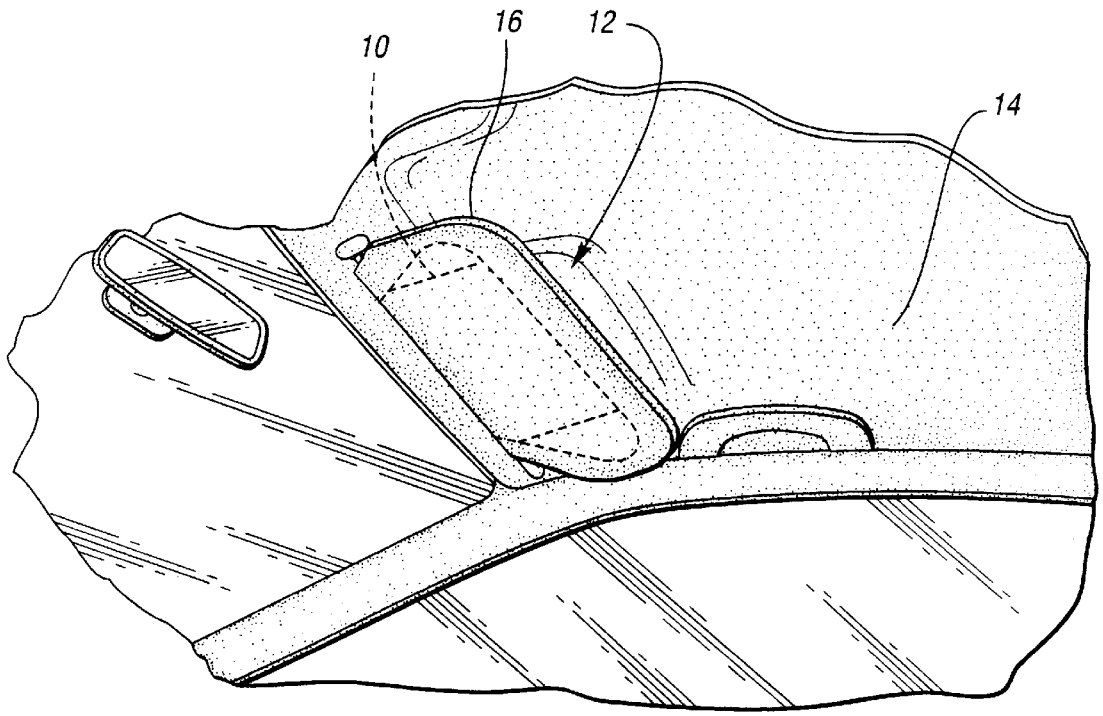
FIG. 1 is an environmental view of a first embodiment of an auxiliary sun visor assembly in accordance with the present invention shown in a stored position between a headliner and a main visor of a vehicle.
Figure 2:
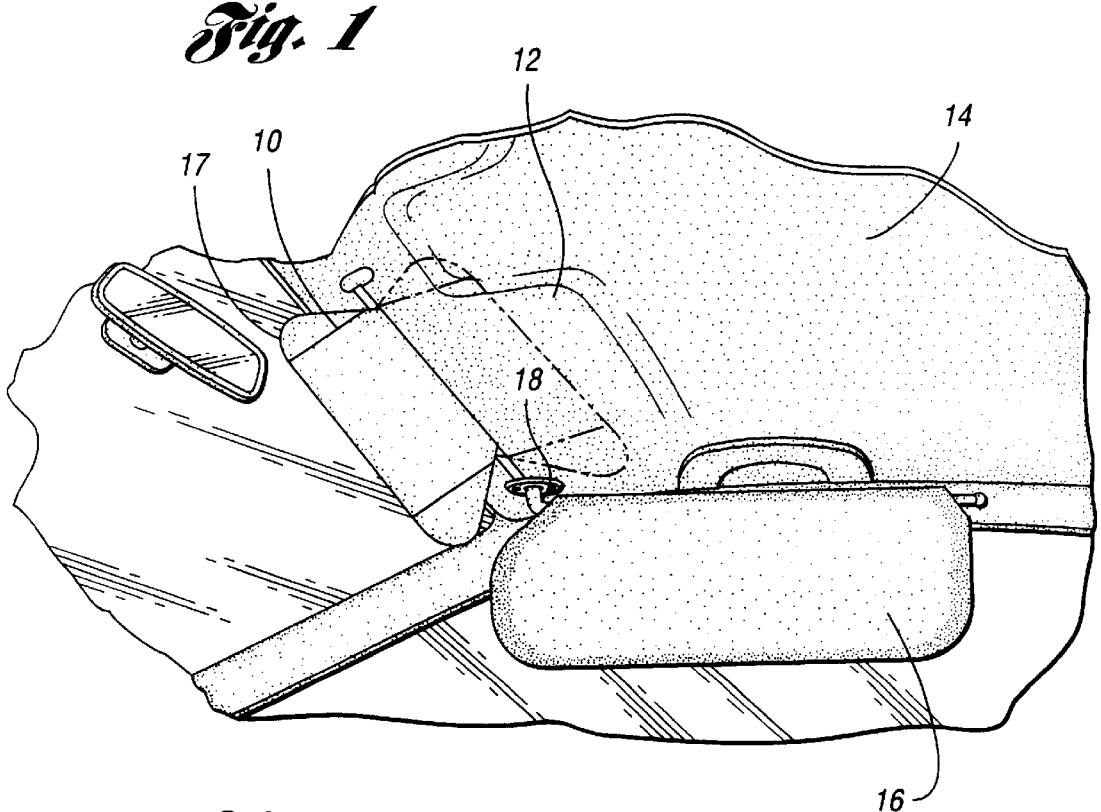
FIG. 2 is a side environmental view of the first embodiment of the sun visor assembly of FIG. 1 shown in the stored position.

FIGS. 1 and 2 illustrate an environmental view of sun visor assembly 10 in accordance with the present invention. Sun visor assembly 10 is implemented as an auxiliary sun visor that is stored in headliner pocket 12 between headliner 14 and main visor blade 16. As shown, auxiliary visor body 17 fits in headliner pocket 12 between headliner 14 and main visor blade 16 without substantially biasing main visor blade 16 away from headliner 14.

Figure 3:
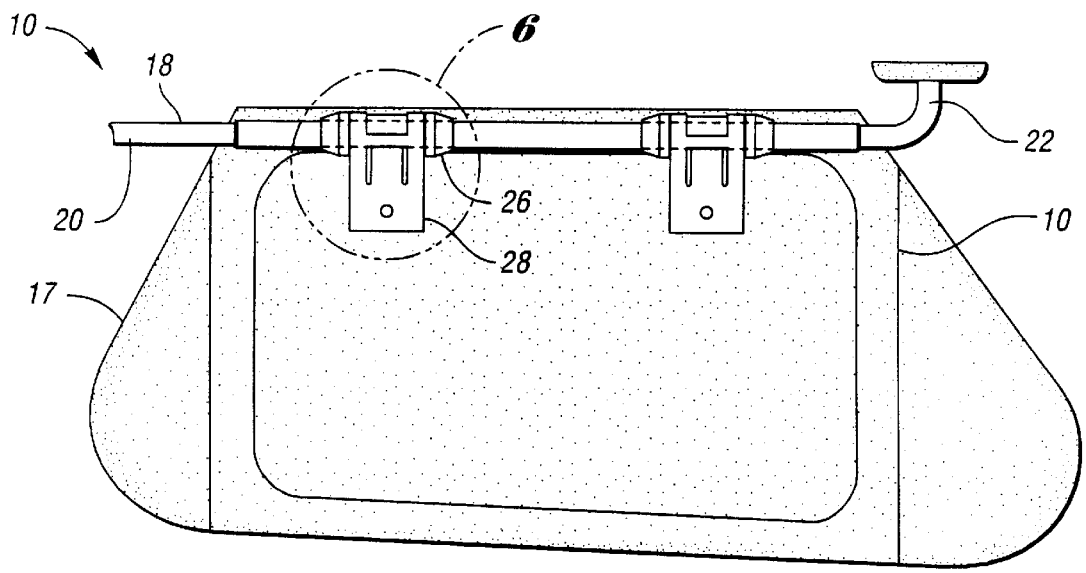
FIG. 3 is a plan view of the first embodiment of the sun visor assembly.

FIG. 3 depicts a view of sun visor assembly 10 including support arm 18 having first and second ends 20, 22 and ridge 24 which extends longitudinally between ends 20, 22. Assembly 10 further includes u-shaped bushing 26 which is disposed about support arm 18 and is slidably moveable along ridge 24, restricting the length along which unshaped bushing may slide. Assembly 10 further includes detent clip 28 which is attached about u-shaped bushing 26 and is pivotably moveable thereabout.

Figure 4:
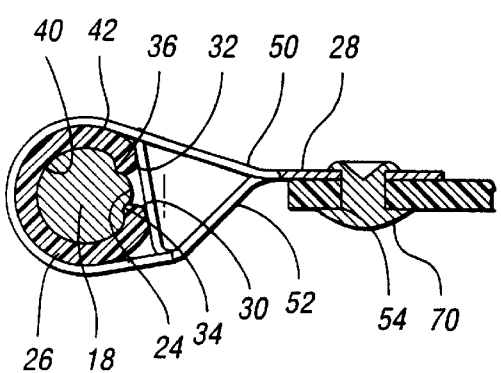
FIG. 4 is a cross-sectional view of the first embodiment of the sun visor assembly in a bridged position.

FIG. 4 illustrates assembly 10 in a stored or bridged position in headliner pocket 12 between headliner 14 and main visor blade 16. FIG. 4 depicts unshaped bushing 26 having terminal portions 30, 32 wrapped around support arm 18 between detent clip 28 and support arm 18. Terminal portions 30, 32 terminate substantially at opposite sides 34, 36 of ridge 24. As shown, ridge 24 fits between terminal portions 30, 32 and acts as an obstruction thereto to prevent bushing 26 from substantial pivotal movement about support arm 18. Terminal portions 30, 32 terminate to define lateral opening 38 which extends longitudinally along support arm 18. Terminal portions 30, 32 are in contact with support arm 18 on a concave inner surface 40 of bushing 26 wherein concave inner surface 40 extends inwardly from terminal portions 30, 32 to a point 41 substantially opposite lateral opening 38. Point 41 extends longitudinally in contact with support arm 18. Terminal portions 30, 32 and point 41 of u-shaped bushing 26 have sufficient contact with support arm 18 at sides 34, 36 in order to allow slidable movement of bushing 26 between first and second ends 20, 22 of support arm 18 and in order to maintain a sufficient frictional bias between support arm 18 and bushing 26 to hold bushing 26 in any slidable position between first and second ends 20, 22.

Figure 5:
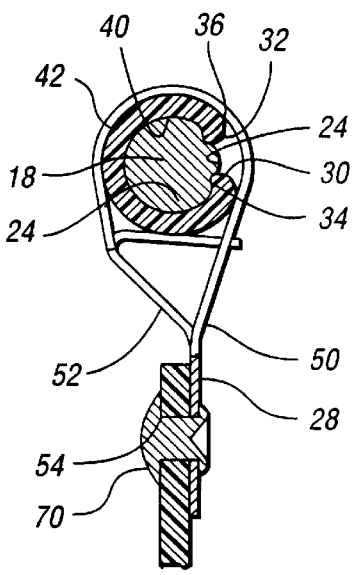
FIG. 5 is a cross-sectional view of the first embodiment of the sun visor assembly in an unbridged position.
Figure 6:
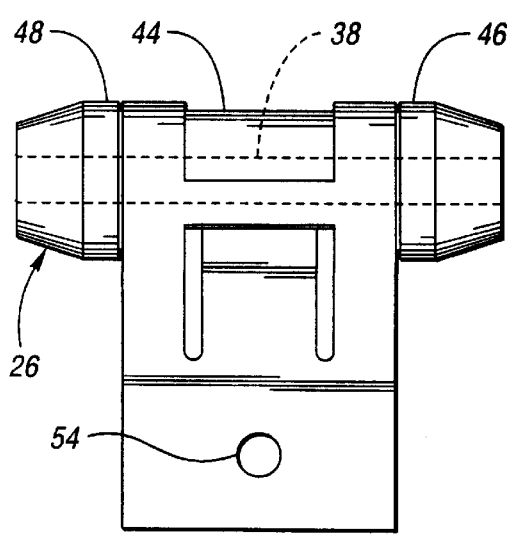
FIG. 6 is an enlarged view of the encircled portion of FIG. 3.

As shown in FIGS. 4–6, u-shaped bushing 26 also includes outer surface 42 having a groove 44 formed thereon to receive detent clip 28 which is pivotably attached thereabout, allowing pivotal movement of detent clip 28 about bushing 26 and slidable movement along support arm 18 with bushing 26. Groove 44 defines a pair of opposed end walls 46, 48 which act to maintain detent clip 28 in slidable movement along support arm 18 with bushing 26. FIG. 5 illustrates assembly 10 in a down or unbridged position wherein detent clip 28 is pivotable about bushing 26 and is maintained in slidable movement by and walls 46, 48 with bushing 26.

FIGS. 4–6 further depicts detent clip 28 including visor support portion 50 and detent portion 52. Visor support portion 50 substantially encircles bushing 26 about which it pivots. Detent portion 52 is pivotable about bushing 26 with visor support portion 50 and defines the stored or bridged position when pivoted to bridge terminal portions 30, 32 over ridge 24 to store visor body 17 in headliner pocket 12 between headliner 14 and main visor blade 16. As shown in FIG. 5, detent clip 28 may be pivoted away from headliner 14, defining the unbridged position of detent clip 28. Detent portion 52 maintains a sufficient frictional bias on bushing 26 in order to hold visor body 17 in the second pivotal position with respect to bushing 26 and yet allow adjustable pivotal movement as desired.

As shown in FIG. 6, visor support portion 50 attaches about outer surface 42 of bushing 26 and is positioned between end walls 46, 48. This allows visor support portion 50 both pivotal movement about bushing 26 and slidable movement along support arm 18 with bushing 26. It should be noted that end walls 46, 48 flank visor support portion 50 in order to hold visor support portion 50 in slidable longitudinal position with u-shaped bushing 26. Visor support portion 50 further includes aperture 54 to allow visor body 17 to attach thereto by any suitable means such as by a rivet 70.

In use, a plurality of assembly 10 may be used to connect visor body 17 onto support arm 18. In this embodiment, a pair of assembly 10 is used. As it can be seen, assembly 10 includes simple and compact components to provide an assembly that adequately fits between headliner 14 and main visor blade 16 without biasing main visor blade 16 away from headliner 14.

Figure 7:
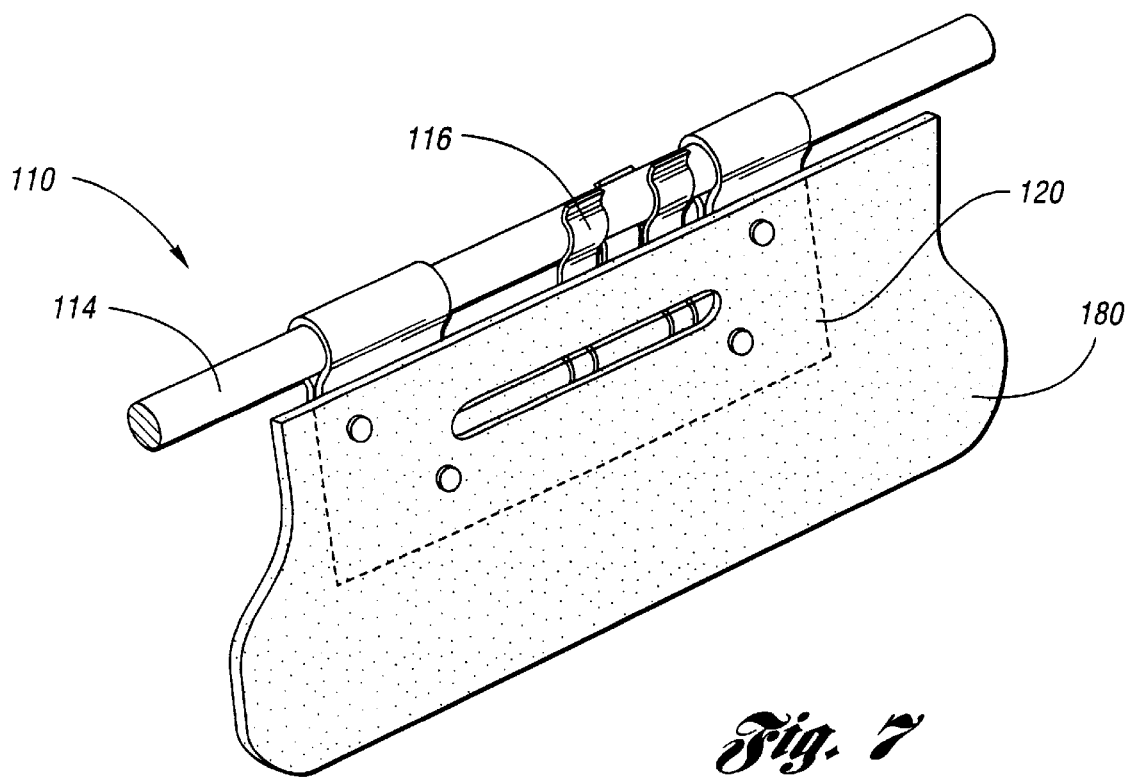
FIG. 7 is a perspective view of a second embodiment of a sun visor assembly in accordance with the present invention.
Figure 8:
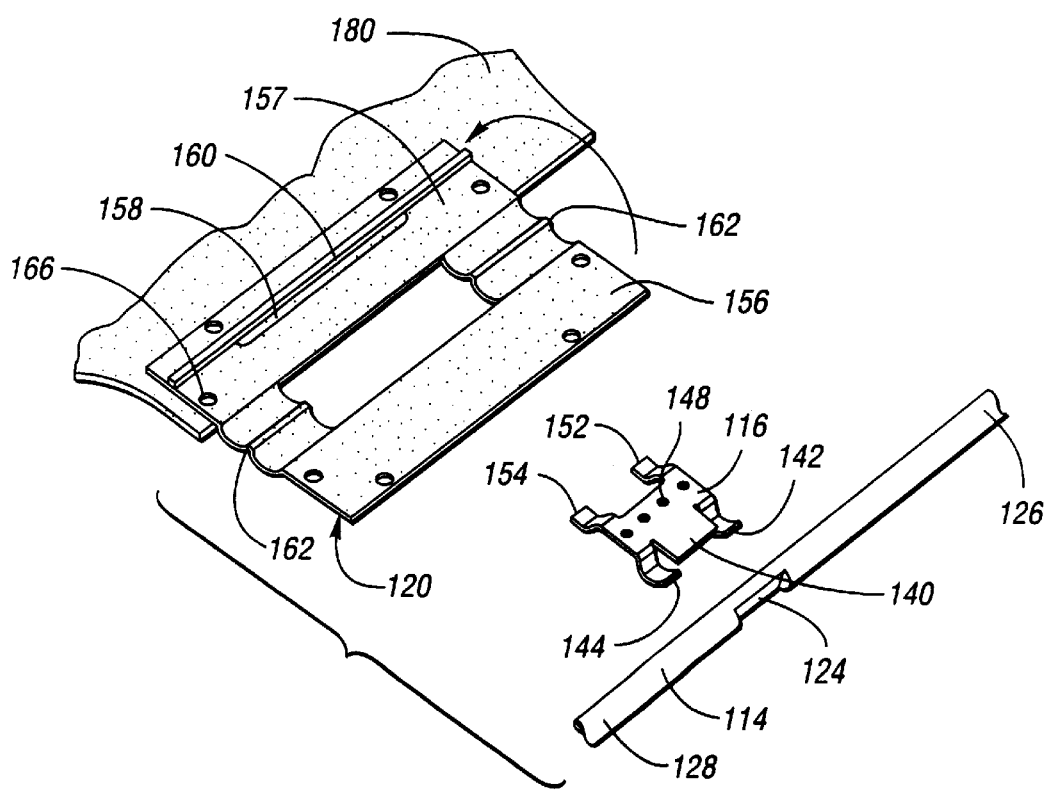
FIG. 8 is an exploded view of the second embodiment of FIG. 7.

FIG. 7 illustrates a perspective view of a second embodiment of the visor assembly in accordance with the present invention. As shown, assembly 110 includes support arm 114, detent control 116 attached thereto, and detent housing 120 in a closed position hinged about support arm 114 and receiving detent control 116. FIG. 8 illustrates assembly 110 in an exploded view. As shown, support arm 114 has a flat formed thereon and first and second ends 126, 128. First end 126 cooperates with a vehicle headliner (not shown).

Detent control 116 includes offset, spaced apart fingers 140, 142, 144 on an upper region thereof for engaging support arm 114 at a fixed location to define a stored or bridged position. More specifically, center finger 140 is offset from side fingers 142, 144 and engages flat 124 as side fingers 142, 144 oppositely engage support arm 114. Fingers 140, 142, 144 maintain sufficient contact with support arm 114 in order to allow pivotal movement of detent control 116 thereabout and in order to maintain sufficient frictional bias between support arm 114 and detent control 116 to prevent longitudinal movement along support arm 114. A central region of detent control 116 has one or more dimples 148 for engaging sidewalls 156, 157 of housing 120 when housing 120 is in the closed position. Dimples 148 are formed on the central region of detent control 116 to decrease the amount of surface area contact between detent control 116 and sidewalls 156, 157 to allow easy slidable movement of housing 120 and yet maintain sufficient frictional bias to hold housing 120 at the desired longitudinal position. A lower region of detent control 116 has spaced apart feet 152, 154 that are arcuately formed which insert into slot 158 of housing 120 and attach onto bar 160 allowing housing 120 longitudinal movement as detent control 116 maintains a stationary lateral position. As shown in FIG. 7, longitudinal movement of housing 120 is limited by detent control 116 in the stationary lateral position, as hinges 162, 164 are laterally obstructed by fingers 140, 142, 144.

As shown in FIGS. 7–8 sidewalls 156, 157 engage to close housing 120. In the closed position, housing 120 receives support arm 114 in hinges 162, 164 and fixes feet 152, 152 in slot 158, as mentioned above. Sidewalls 156, 157 include apertures 166 that receive rivets or any other suitable member to fasten sidewalls 156, 157 together. As housing 120 is in the closed position, detent control 116 is secured therein and engages flat 124 of support arm 114, as described above. Housing 120 then may attach to a visor body 180 for increased sun block coverage.

In use, assembly 110 is stored in a bridged position where center finger 140 is engaged with flat 124. As the visor is pivoted away from the headliner about support arm 114, center finger 140 disengages from flat 124, defining a down or unbridged position. In the down position, the visor body which is attached to the housing 120 may slide with housing 120 along support arm 114. Center finger 140 and side fingers 142, 144 have sufficient contact with support arm 114 in order to allow pivotal movements of detent control 116 about support arm 114 and to prevent longitudinal movements therealong. Also, fingers 140, 142, 144 provide sufficient frictional bias between support arm 114 and detent control 116 to hold assembly 110 in any pivotable position about support arm 114. It is to be noted that detent control 116 remains in a longitudinally stationary position along support arm 114.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sun visor assembly for a vehicle comprising:
    a visor body;
    a support arm having first and second ends and a ridge extending longitudinally between the ends, the first end being adapted to cooperate with the vehicle;
    a detent clip for supporting the visor body and movable pivotably and slidable longitudinally with respect to the support arm between the first and second ends; and
    a u-shaped bushing having terminal portions wrapped around the support arm between the detent clip and the support arm and terminating substantially at opposite sides of the ridge so that the bushing is pivotably stationary with respect to the support arm,
    the detent clip having a visor support portion and a detent portion, the visor support portion substantially encircling the u-shaped bushing and pivotable with respect to the bushing, and the detent portion pivotably movable between a bridged position when pivoted to bridge the terminal portions of the bushing to store the visor body and an unbridged position when pivoted away from the bridged position to maintain a sufficient frictional bias between the bushing and the detent portion to hold the visor body in a pivotal position with respect to the bushing.

2. The sun visor assembly of claim 1 wherein the terminal portions of the unshaped bushing have sufficient contact with the support arm to allow slidable movement therealong between the first and second ends of the support arm and to maintain a sufficient frictional bias between the support arm and the u-shaped bushing, holding the bushing in any slidable position between the first and second ends.

3. The sun visor assembly of claim 2 wherein the terminal portions have sufficient contact with the support arm on an inner surface extending inwardly from the terminal portions, the terminal portions terminating to define a lateral opening of the bushing, the opening extending longitudinally along the support arm.

4. The sun visor assembly of claim 3 wherein the bushing has sufficient contact with the support arm on the inner surface substantially opposite the lateral opening.

5. The sun visor assembly of claim 1 wherein the u-shaped bushing has an outer surface formed to receive the visor support portion pivotably attached thereabout to allow the visor support portion pivotal movement about the u-shaped bushing and to allow slidable movement along the support arm with the u-shaped bushing.

6. The sun visor assembly of claim 5 wherein the outer surface of the u-shaped bushing has a groove about which the visor support portion attaches, the groove defining a pair of opposed end walls flanking the visor support portion to hold the visor support portion in slidable longitudinal position with the u-shaped bushing.

7. An auxiliary sun visor assembly for a vehicle comprising:
    a visor body;
    a support arm having first and second ends and a ridge extending longitudinally between the ends, the first end being adapted to cooperate with the vehicle;
    a detent clip for supporting the visor body and movable pivotably and slidable longitudinally with respect to the support arm between the first and second ends; and
    a u-shaped bushing having terminal portions wrapped around the support arm between the detent clip and the support arm and terminating at opposite sides of the ridge, thereby preventing the bushing from substantial pivotal movement with respect to the support arm,
    the detent clip having a visor support portion and a detent portion, the visor support portion substantially encircling the unshaped bushing and pivotable with respect to the bushing, and the detent portion pivotable with the visor support portion and having a bridged position when pivoted to bridge the terminal portions of the bushing to store the visor body and an unbridged position when pivoted away from the bridged position and configured to maintain a sufficient frictional bias between the bushing and the detent portion to hold the visor body in any pivotal position with respect to the bushing,
    the u-shaped bushing having a groove formed on an outer surface of the bushing to receive the visor support portion pivotably attached thereabout, the groove defining a pair of opposed end walls flanking the visor support portion to hold the visor support portion in slidable longitudinal position with the bushing.

8. The auxiliary sun visor assembly of claim 7 wherein the terminal portions of the unshaped bushing have sufficient contact with the support arm to allow slidable movement therealong between the first and second ends of the support arm and to maintain a sufficient frictional bias between the support arm and the unshaped bushing, holding the bushing in any suitable position between the first and second ends.

9. The auxiliary sun visor assembly of claim 8 wherein the terminal portions have sufficient contact with the support arm on an inner surface extending inwardly from the terminal portions, the terminal portions terminating to define a lateral opening of the bushing, the opening extending longitudinally across the support arm.

10. The auxiliary sun visor assembly of claim 9 wherein the bushing has sufficient contact with the support arm on the inner surface substantially opposite the lateral opening.

* * * * *

UNITED STATES PATENT AND TRADEMARK OFFICE
CERTIFICATE OF CORRECTION

PATENT NO.    : 6,296,293 B1
DATED         : October 2, 2001
INVENTOR(S)   : Peterson et al.

It is certified that error appears in the above-identified patent and that said Letters Patent is hereby corrected as shown below:

Column 5, claim 2,
Line 58, delete "unshaped", and insert -- u-shaped -- therefor.

Column 6, claim 7,
Line 34, delete "unshaped", and insert -- u-shaped -- therefor.

Column 6, claim 8,
Line 51, delete "unshaped", and insert -- u-shaped -- therefor.
Line 55, delete "unshaped", and insert -- u-shaped -- therefor.

Signed and Sealed this

Twelfth Day of March, 2002

Attest:

JAMES E. ROGAN
Attesting Officer        Director of the United States Patent and Trademark Office